United States Patent
Rosner et al.

(10) Patent No.: US 8,819,326 B1
(45) Date of Patent: Aug. 26, 2014

(54) HOST/CLIENT SYSTEM HAVING A SCALABLE SERIAL BUS INTERFACE

(75) Inventors: Stephan Rosner, Campbell, CA (US); Qamrul Hasan, Mountain View, CA (US); Jeremy Mah, San Jose, CA (US)

(73) Assignee: Spansion LLC, Sunnyvale, CA (US)

( * ) Notice: Subject to any disclaimer, the term of this patent is extended or adjusted under 35 U.S.C. 154(b) by 40 days.

(21) Appl. No.: 11/638,338

(22) Filed: Dec. 12, 2006

(51) Int. Cl.
*G06F 13/36* (2006.01)

(52) U.S. Cl.
USPC .............................. 710/311; 65/313; 65/315

(58) Field of Classification Search
USPC .................................. 710/311, 313, 65, 315
See application file for complete search history.

(56) References Cited

U.S. PATENT DOCUMENTS

| | | | | |
|---|---|---|---|---|
| 5,886,992 A * | 3/1999 | Raatikainen et al. | ......... | 370/410 |
| 5,918,073 A * | 6/1999 | Hewitt | ............................ | 710/52 |
| 5,943,506 A * | 8/1999 | Poisner | ............................ | 710/48 |
| 5,951,667 A * | 9/1999 | Abramson | .................... | 710/309 |
| 6,067,589 A * | 5/2000 | Mamata | ........................... | 710/63 |
| 6,119,194 A * | 9/2000 | Miranda et al. | ............... | 710/306 |
| 6,639,434 B1 * | 10/2003 | Rahman | ........................ | 327/108 |
| 6,654,281 B2 * | 11/2003 | Georgakos et al. | ...... | 365/185.05 |
| 7,058,738 B2 * | 6/2006 | Stufflebeam, Jr. | ............ | 710/104 |
| 7,136,953 B1 * | 11/2006 | Bisson et al. | ................. | 710/307 |
| 7,292,876 B2 * | 11/2007 | Bosch et al. | ................ | 455/556.1 |
| 7,587,536 B2 * | 9/2009 | McLeod | ........................ | 710/65 |
| 2006/0206626 A1 * | 9/2006 | Sleeman | .......................... | 710/5 |
| 2008/0022024 A1 * | 1/2008 | Mao | .............................. | 710/104 |

OTHER PUBLICATIONS

ARM. AMBA Specification. Rev. 2.0. May 13, 1999.*
ARM. AMBA AXI Protocol. v1.0. Specification. May 19, 2004.*
ARM. AHB CPU Wrappers. Technical Reference Manual. May 18, 2001.*

* cited by examiner

*Primary Examiner* — Matthew D Spittle
(74) *Attorney, Agent, or Firm* — Sterne, Kessler, Goldstein & Fox P.L.L.C.

(57) ABSTRACT

According to one exemplary embodiment, a host/client system includes a host module, which includes a CPU coupled to a system bridge. The host/client system further includes at least one client having an integrated interface, where the integrated interface is coupled to the system bridge through a scalable serial bus. The system bridge and the integrated interface enable high bandwidth communication between the CPU and the at least one client through the scalable serial bus, thereby allowing control of bus width between the host module and the client.

9 Claims, 4 Drawing Sheets

HOST/CLIENT SYSTEM HAVING A SCALABLE SERIAL BUS INTERFACE

1. TECHNICAL FIELD

The present invention is generally in the field of electronic circuits. More particularly, the present invention is in the field of bus interface design.

2. BACKGROUND

Modern embedded systems, such as mobile phones and other portable electronic devices, typically include a host CPU which communicates with various clients, such as volatile random access memory devices and nonvolatile random access memory devices, through conventional multi-drop bus interfaces. Such clients typically require many address and control lines, thus requiring wide buses between the host CPU and the clients, and may each require different interface and control circuitry.

As such embedded systems are continuously miniaturized to meet consumer demand, however, the available space on the circuit boards used therein as well as the cost to provide pins for the address, control and data lines on the device packages is becoming critically limited. As a result of such space limitations, it has become difficult to enhance the performance of the clients without further widening the already wide buses between the host CPU and the clients. Moreover, an increase in bus width would require an increase in the pin counts of the host CPU and clients, thereby increasing costs. In addition, enhancing the performance of the clients by increasing data transfer rates between the host and the clients has also become difficult since the operation frequencies of conventional multi-drop bus interfaces are rapidly approaching their physical limits.

SUMMARY OF THE INVENTION

The present invention is directed to a host/client system having a scalable serial bus interface. The invention addresses and resolves the need in the art for a scalable serial bus interface which increases performance of a client while allowing control of bus width.

According to one exemplary embodiment, a host/client system includes a host module, which includes a CPU coupled to a system bridge. The host/client system further includes at least one client having an integrated interface, where the integrated interface is coupled to the system bridge through a scalable serial bus. The at least one client can be, for example, a NOR type memory device, a NAND type memory device, or a volatile random access memory device. According to this exemplary embodiment, the scalable serial bus is a time shared bus. According to this exemplary embodiment, the integrated interface and the system bridge include a physical layer configured to receive and transmit electronic signals using, for example, low voltage differential signaling. The integrated interface and the system bridge further include a control layer coupled to the physical layer. According to this exemplary embodiment, the integrated interface and the system bridge includes an instruction layer.

In one embodiment, a number of clients having integrated interfaces can be serially coupled to the integrated interface of the at least one client through the scalable serial bus, where the at least one client and each of the number of clients are capable of communicating with each other. The scalable serial bus enables scaling of the data transfer rate of the scalable serial bus, the number of channels on the scalable serial bus, and the bus width. Thus, the system bridge and the integrated interface enable high bandwidth communication between the CPU and the at least one client through the scalable serial bus, thereby allowing control of bus width between the host module and the at least one client. Other features and advantages of the present invention will become more readily apparent to those of ordinary skill in the art after reviewing the following detailed description and accompanying drawings.

DETAILED DESCRIPTION OF THE INVENTION

The present invention is directed to a host/client system having a scalable serial bus interface. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention.

The drawings in the present application and their accompanying detailed description are directed to merely exemplary embodiments of the invention. To maintain brevity, other embodiments of the present invention are not specifically described in the present application and are not specifically illustrated by the present drawings.

Figure 1:
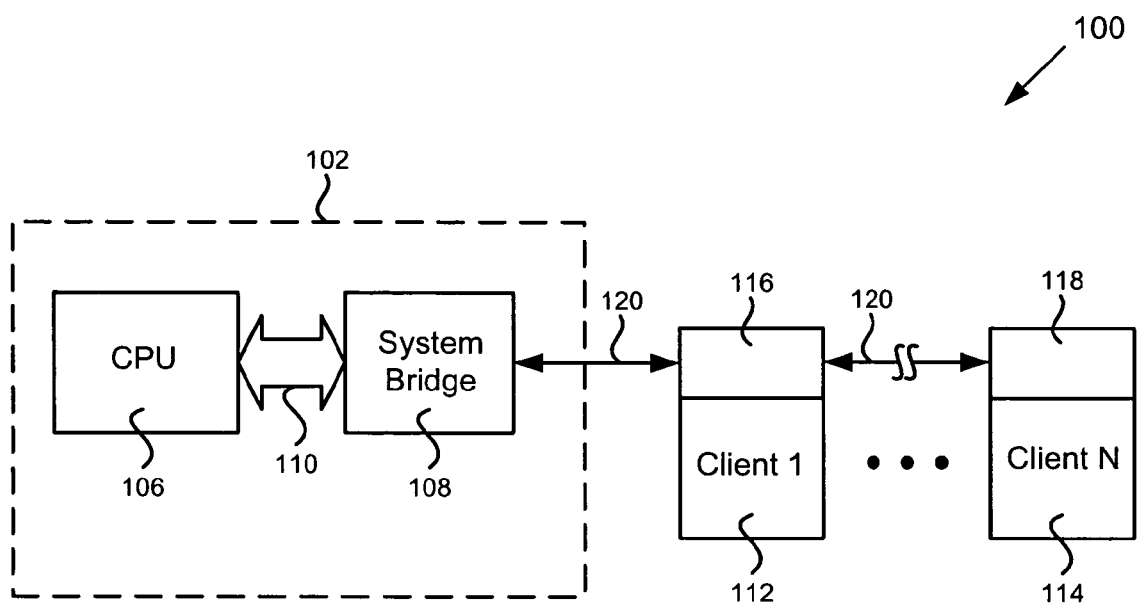
FIG. 1 illustrates a block diagram of a host/client system having a scalable serial bus interface in accordance with one embodiment of the present invention.

FIG. 1 shows a block diagram of an exemplary host/client system having a scalable serial bus interface in accordance with one embodiment of the present invention. In FIG. 1, host/client system 100 includes host module 102 and clients 112 and 114. Host module 102 includes Central Processing Unit (CPU) 106 coupled to system bridge 108 through system bus 110. As shown in FIG. 1, clients 112 and 114 have respective integrated interfaces 116 and 118. For example, clients 112 and 114 can be NOR type memory devices, NAND type memory devices, or dynamic random access memory devices. As shown in FIG. 1, integrated interface 116 of client 112 is serially coupled to system bridge 108 through scalable serial bus 120, and integrated interface 118 of client 114 is serially coupled to integrated interface 116 of client 112 through scalable serial bus 120. In other embodiments, additional clients can be serially coupled between clients 112 and client 114. Therefore, in the present embodiment, client 112 can represent the first client and client 114 can represent the nth client in a chain of serially coupled clients.

In host/client system 100 shown in FIG. 1, CPU 106 can communicate with system bridge 108 through system bus 110, which can be for example, an Advanced High-performance Bus (AHB). System bridge 108 can communicate with clients 112 and 114 through scalable serial bus 120. Scalable serial bus 120 can be, for example, a high bandwidth serial bus which uses low voltage differential signaling (LVDS) or other related signaling technology known in the art. As discussed below, the scalable serial bus 120 is a serial bus which can provide communication between system bridge 108 and one or more clients (e.g., clients 112 and 114), scalable serial bus 120 can be used as a time shared bus where each client has access to the bus on a time-based access scheme (as opposed to a transaction-oriented bus where the bus is granted to a client until a particular transaction is completed resulting in less predictable bus utilization). Accordingly, clients 112 and 114 in FIG. 1 will have access to scalable serial bus 120 during particular timeslots by using, for example, an appropriate time division multiple access (TDMA) scheme.

Thus, system bridge 108, scalable serial bus 120 and interfaces 116 and 118 in FIG. 1 enable high bandwidth serial communication between CPU 106 in host module 102 and clients 112 and 114. As will be discussed, host/client system 100 in FIG. 1 allows CPU 106 to communicate with any client which is serially coupled to scalable serial bus 120. Each integrated interface (e.g., integrated interface 116) of each client (e.g., client 112) coupled to serial scalable bus 120 can interpret communications transmitted by CPU 106 to determine whether the communication is intended for its respective client, or for another client. Communications intended for another client are sequentially transmitted from one neighboring client to the next until the communication reaches the intended client thus effectively implementing a routing protocol in a network, e.g. a chain as described in FIG. 1.

Figure 2:
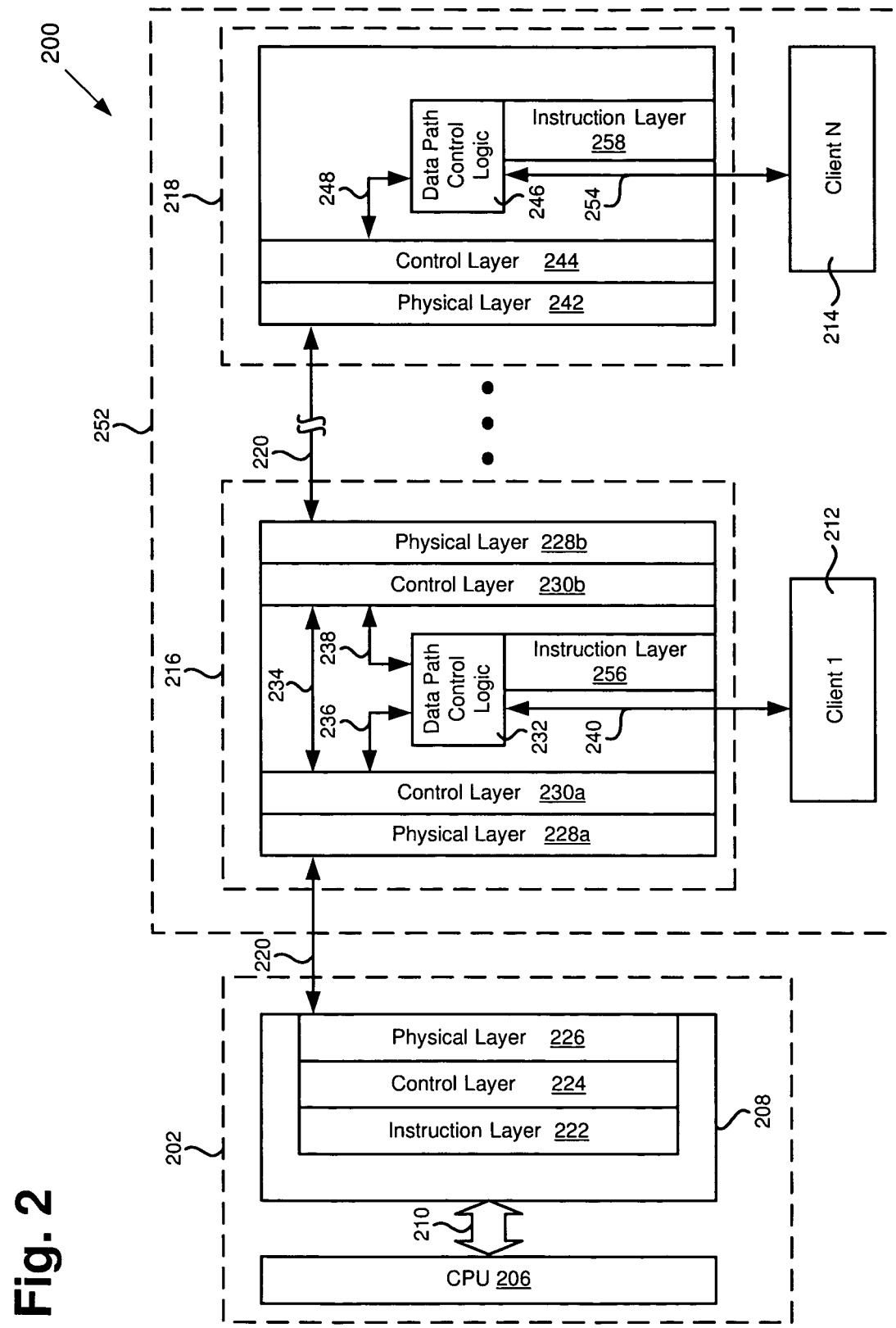
FIG. 2 illustrates the details of the host/client system having a scalable serial bus interface in FIG. 1 in accordance with one embodiment of the present invention.

FIG. 2 shows host/client system 200, which illustrates the details of host/client system 100 shown in FIG. 1. Host/client system 200 in FIG. 2 includes host module 202, clients 212 and 214, integrated interfaces 216 and 218, and scalable serial bus 220 which correspond to host module 102, clients 112 and 114, integrated interfaces 116 and 118, and scalable serial bus 120 in FIG. 1. Host module 202 in FIG. 2 includes CPU 206, system bridge 208, and system bus 210 which corresponds to CPU 106, system bridge 108, and system bus 110 in FIG. 1.

As shown in FIG. 2, CPU 206 in host module 202 is coupled to and in communication with system bridge 208 through system bus 210. System bridge 208 includes physical layer 226, control layer 224, and instruction layer 222. Physical layer 226 is coupled to control layer 224, which is coupled to instruction layer 222. Physical layer 226 and control layer 224 can each include, for example, control and payload registers (not shown in FIG. 2). As also shown in FIG. 2, system bridge 208, integrated interface 216 of client 212, and integrated interface 218 of client 214 are all serially coupled via scalable serial bus 220. As further shown in FIG. 2, host module 202 is in communication with clients 212 and 214, which can be situated, for example, in a separate module, such as client module 252. Integrated interface 216 in FIG. 2 includes physical layers 228a and 228b, control layers 230a and 230b, and data path control logic 232. Integrated interface 218 includes physical layer 242, control layer 244, and data path control logic 246.

In client interface 216, physical layers 228a and 228b are respectively coupled to control layers 230a and 230b. Control layers 230a and 230b are each in communication with data path control logic 232 via respective internal data paths 236 and 238. Data path control logic 232 is coupled to instruction layer 256 and further coupled to client 212 via client data path 240. Control layers 230a and 230b are also in direct communication with each other via external data path 234. In integrated interface 218, physical layer 242 is coupled to control layer 244. Control layer 244 is in communication with data path control logic 246 via internal data path 248. Data path control logic 246 is coupled to instruction layer 258 and further coupled to client 214 via client data path 254.

In host/client system 200 in FIG. 2, each physical layer (e.g., physical layers 226, 228a, 228b, and 242) can perform electrical signaling functions, thereby allowing each physical layer to transmit and receive streams of data (e.g., bitstreams) through scalable serial bus 220 using, for example, low voltage differential signaling techniques. Each control layer (e.g., control layers 224, 230a, 230b, and 244) shown in FIG. 2 can decode incoming bitstreams to extract desired data and encode outgoing data into bitstreams for transmission over scalable serial bus 220. Each control layer (e.g., control layers 224, 230a, 230b, and 244) can also define the channels on scalable serial bus 220 and can map outgoing data into appropriate timeslots considering the number of channels and bit lanes available on scalable serial bus 220. Each instruction layer shown in FIG. 2 (e.g., instruction layers 222, 256, and 258) can initiate instructions based on incoming data received from its associated control layer and can initiate outgoing instructions to its associated control layer 224 for encoding.

In an exemplary operation of host/client system 200, a command is communicated by CPU 206 to client 214 which, for example, can be a NOR type flash memory device. The command, which can be a memory read or write command, for example, is communicated to instruction layer 222 which initiates the required instructions for execution of the command and communicates these instructions to control layer 224. The instructions are then encoded by control layer 224 into a bitstream and a timeslot is specified for when transmission of the bit stream can take place. The bit stream is then provided to physical layer 226 and transmitted through scalable serial bus 220 to the integrated interface of a neighboring client coupled to scalable serial bus 220 (e.g., integrated interface 216).

The bit stream is then received by physical layer 228a of integrated interface 216 and is then communicated to control layer 230a. Control layer 230a then determines whether the bit stream is intended for client 212 or for another client. Since in the present example the bit stream is intended for client 214, the bit stream is transmitted by control layer 230a to control layer 230b via external data path 234. The bit stream is then communicated to physical layer 228b and transmitted to physical layer 242 of integrated interface 218 via scalable serial bus 220. The bit stream is then communicated by physical layer 242 to control layer 244, where it is decoded and communicated to data path control logic 246 through internal data path 248. The decoded bit stream is then communicated to instruction layer 258, where the appropriate instructions are initiated and provided to client 214 through client data path 254.

Host/client system 200 in FIG. 2 also allows communication between clients that are serially coupled to scalable serial bus 220 through their respective integrated interfaces. For example, client 214 can communicate data via data path 254 to data path control logic 246. The data can then be communicated via internal data path 248 to control layer 244 and thus further communicated to physical layer 242 for transmission to physical layer 228b via scalable serial bus 220. Once received by physical layer 228b, the data can be communicated to control layer 230b and further communicated to data path control logic 232 via internal data path 238. As mentioned above, each physical layer, control layer, and instruction layer, might include a control register which can be configured to ensure proper switching between the data paths, such as external data path 234 and internal data path 238. The data can then be communicated from data path control logic 232 to client 212 via client data path 240.

Figure 3:
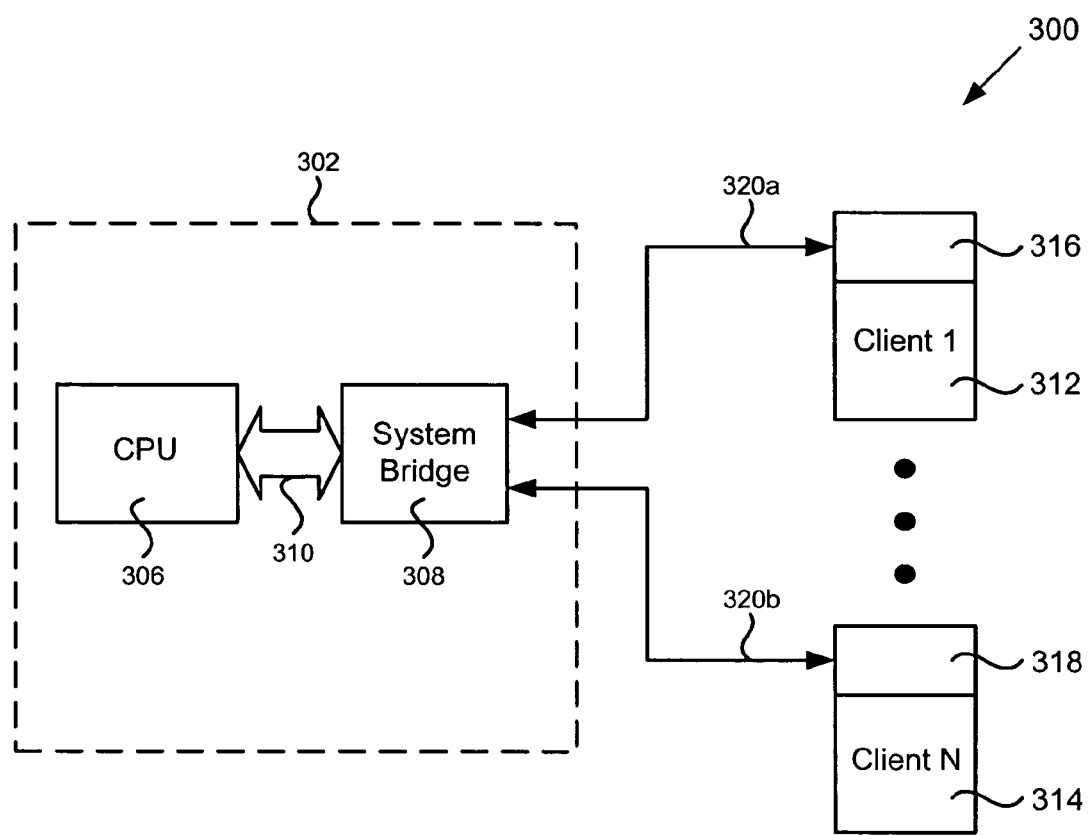
FIG. 3 illustrates a block diagram of a host/client system having a scalable serial bus interface in accordance with one embodiment of the present invention.

FIG. 3 shows a block diagram of an exemplary host/client system in accordance with one embodiment of the present invention. In FIG. 3, host/client system 300 includes host module 302 and clients 312 and 314. Host module 302 includes Central Processing Unit (CPU) 306 which is coupled to and in communication with system bridge 308 through system bus 310. As shown in FIG. 3, clients 312 and 314 have respective integrated interfaces 316 and 318. For example, clients 312 and 314 can be NOR type memory devices, NAND type memory devices, or dynamic random access memory devices.

As shown in FIG. 3, integrated interface 316 of client 312 is coupled to system bridge 308 through scalable serial bus 320a, and interface 318 of client 314 is coupled to system bridge 308 through scalable serial bus 320b. In other embodiments, additional clients can be coupled to system bridge 308 through additional scalable serial buses. For example, system bride 308 can include a physical layer, a control layer, and an instruction layer in a configuration similar to system bridge 208 in FIG. 2 and integrated interfaces 316 and 318 can each include a configuration of physical layers, control layers, instruction layers, and data path control logic blocks similar to the integrated interfaces discussed above, such as integrated interface 216. Thus, in the present embodiment, each client (e.g., client 314) can communicate with CPU 306 through system bridge 308 via its integrated interface (e.g., interface 318) and scalable serial bus (e.g., scalable serial bus 320b).

Figure 4:
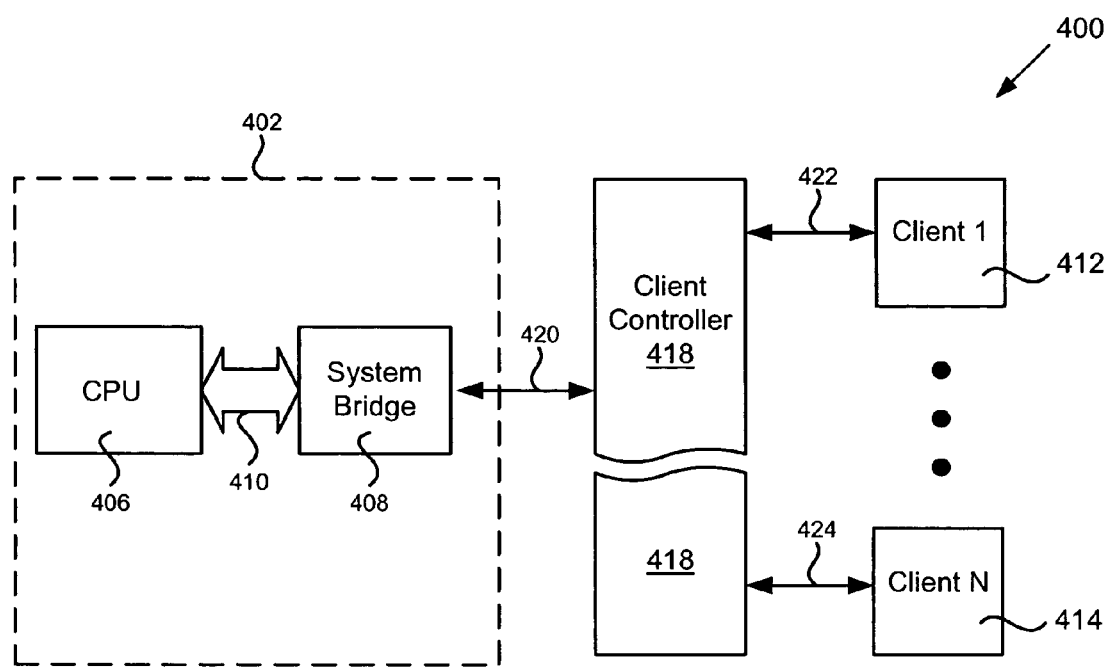
FIG. 4 illustrates a block diagram of a host/client system having a scalable serial bus interface in accordance with one embodiment of the present invention.

FIG. 4 shows a block diagram of an exemplary host/client system in accordance with one embodiment of the present invention. In FIG. 4, host/client system 400 includes host module 402, client controller 418, and clients 412 and 414. Host module 402 includes Central Processing Unit (CPU) 406 coupled to system bridge 408 through system bus 410. For example, clients 412 and 414 can be NOR type memory devices, NAND type memory devices, or dynamic random access memory devices.

As shown in FIG. 4, client controller 418 is coupled to and in communication with system bridge 408 through scalable serial bus 420. Clients 412 and 414 are coupled to client controller 418 through data paths 422 and 424, respectively. In other embodiments, additional clients can be coupled to client controller 418. For example, system bridge 408 and client controller 418 can include physical layers, a control layers, and instruction layers in a configuration similar to system bridge 208 in FIG. 2. For example, client controller 418 can be a video module, a graphics module, or an encryption module. Client controller 418 in FIG. 4 can include logic which can interpret commands communicated to a client (e.g., client 412) by CPU 406 to provide the client with the proper signals (e.g., control signals) for execution of the commands. Thus, the embodiment of the invention shown in FIG. 4 allows one or more clients to communicate with a CPU over a scalable serial bus using a client controller which can be adapted to interpret commands transmitted and received between the CPU and each client. Accordingly, clients 412 and 414 in FIG. 4, which can be conventional memory devices that do not include integrated interfaces, can be controlled through client controller 418 and thus interface with system bridge 408 without requiring modifications.

In other embodiments, a client with an integrated interface can be coupled to system bridge 408 through scalable serial bus 420. Client controller 418 can then be coupled to the integrated interface of the client to properly control other clients without integrated interfaces as described above. In addition, client controller 418 can implement security features so as to allow the CPU to authenticate conventional clients which do not include integrated interfaces.

The present invention, as shown in the embodiments in FIGS. 1 through 4, illustrates an exemplary host/client system where a CPU in a host module can communicate with one or more clients through a scalable serial bus. As discussed above, the scalable serial bus can provide high bandwidth communication between the CPU and the client and therefore, and can provide higher data transfer rates than conventional multi-drop bus interfaces by adjusting the bus frequency which is enabled by low-voltage differential signaling I/Os. As such, the performance of each client can be increased without having to increase the bus width between the host module and the clients, thereby allowing control of the bus width. Thus, since the present invention can actually increase client performance using fewer bus lines than conventional multi-drop bus interfaces, the respective pin counts of the host module and the clients can be advantageously reduced. Accordingly, the present invention can provide significant cost savings and facilitate routability of bus lines between a host module and one or more clients.

Therefore, the present invention can also provide substantial design flexibility by allowing the scalable serial bus to scale in terms of data transfer rate, number of available channels, and bus width. For example, if a design incorporating the embodiment in FIG. 1 requires many clients, then latencies typically created by a long chain of serially coupled Clients can be reduced by using additional scalable serial buses as shown in the embodiment of FIG. 3. Furthermore, the present invention can be conveniently integrated for use with conventional clients, e.g., conventional memory devices which do not include integrated interfaces, by using a client controller as shown in the embodiment in FIG. 4.

As can be appreciated in the art, the present invention, for example the embodiment shown in FIG. 1 as host/client system 100, can be utilized in a variety of electronic modules, devices or electronic systems, for example, a wired or wireless communications device, a cell phone, a switching device, a router, a repeater, a codec, a LAN, a WLAN, a Bluetooth enabled device, a digital camera, a digital audio player and/or recorder, a digital video player and/or recorder, a computer, a monitor, a television set, a satellite set top box, a cable modem, a digital automotive control system, a digitally-controlled home appliance, a printer, a copier, a digital audio or video receiver, an RF transceiver, a personal digital assistant (PDA), a digital game playing device, a digital testing and/or measuring equipment, digital avionics equipment, or a digitally-controlled medical equipment, or in any other kind of module utilized in modern electronics applications.

From the above description of the invention it is manifest that various techniques can be used for implementing the concepts of the present invention without departing from its scope. Moreover, while the invention has been described with specific reference to certain embodiments, a person of ordinary skill in the art would appreciate that changes can be made in form and detail without departing from the spirit and the scope of the invention. Thus, the described embodiments are to be considered in all respects as illustrative and not restrictive. It should also be understood that the invention is not limited to the particular embodiments described herein but is capable of many rearrangements, modifications, and substitutions without departing from the scope of the invention.

Thus, a host/client system having a scalable serial bus interface has been described.

The invention claimed is:

1. A host/client system comprising:
a system bridge;
a host module including a CPU coupled to the system bridge;
a scalable serial bus coupled to the system bridge; and
first and second clients, each having an integrated interface, the second client being coupled to the first client via the scalable serial bus and the first client being coupled to the system bridge via the scalable serial bus;
wherein the integrated interface of the first client is configured to:
receive a communication from the CPU over the scalable serial bus,
determine whether the communication is intended for the first client, and, if so, to send the communication to an instruction layer of the first client, and
determine whether the communication is intended for the second client and, if so, to send the communication to the second client via the scalable serial bus.

2. The host/client system of claim 1, wherein the integrated interface of at least one of the first and second clients and the system bridge each include a physical layer configured to receive and transmit electronic signals using low voltage differential signaling.

3. The host/client system of claim 2, wherein the integrated interface of the at least one of the first and second clients and the system bridge each include a control layer coupled to the physical layer.

4. The host/client system of claim 1, wherein the integrated interface of the second client and the system bridge each further comprise an instruction layer.

5. The host/client system of claim 1, wherein at least one of the first and second clients a NOR type memory device, a NAND type memory device, or a dynamic random access memory device.

6. The host/client system of claim 1, wherein the system is utilized in an electronic device selected from a wired communications device, a wireless communications device, a cell phone, a switching device, a router, a repeater, a codec, a LAN, a WLAN, a Bluetooth enabled device, a digital camera, a digital audio player and/or recorder, a digital video player and/or recorder, a computer, a monitor, a television set, a satellite set top box, a cable modem, a digital automotive control system, a digitally-controlled home appliance, a printer, a copier, a digital audio or video receiver, an RF transceiver, a personal digital assistant (PDA), a digital game playing device, a digital testing and/or measuring equipment, digital avionics equipment, or a digitally-controlled medical equipment.

7. The host/client system of claim 1, wherein the scalable serial bus is a time shared bus.

8. The host/client system of claim 1, wherein the first and second clients are configured to communicate with each other using the scalable serial bus.

9. The host/client system of claim 1, wherein the integrated interface of the first client is further configured to define channels on the scalable serial bus for the communication and to map the communication to one or more timeslots for transmission on the scalable serial bus.

* * * * *